June 26, 1951  E. L. J. JADOUL  2,558,360
METHOD AND MEANS FOR ELECTRICAL WELDING CHIEFLY
IN THE PRODUCTION OF METAL CONTAINERS
Filed Feb. 15, 1949  6 Sheets-Sheet 1

INVENTOR
EDMOND LEON JEAN JADOUL
Richardson and David
BY
ATTYS

June 26, 1951  E. L. J. JADOUL  2,558,360
METHOD AND MEANS FOR ELECTRICAL WELDING CHIEFLY
IN THE PRODUCTION OF METAL CONTAINERS
Filed Feb. 15, 1949  6 Sheets-Sheet 2

INVENTOR
EDMOND LEON JEAN JADOUL
B) Richardson and David
ATTYS

June 26, 1951            E. L. J. JADOUL          2,558,360
METHOD AND MEANS FOR ELECTRICAL WELDING CHIEFLY
IN THE PRODUCTION OF METAL CONTAINERS
Filed Feb. 15, 1949                      6 Sheets-Sheet 4

INVENTOR
EDMOND LEON JEAN JADOUL
By Richardson and David
Attys

June 26, 1951  E. L. J. JADOUL  2,558,360
METHOD AND MEANS FOR ELECTRICAL WELDING CHIEFLY
IN THE PRODUCTION OF METAL CONTAINERS
Filed Feb. 15, 1949  6 Sheets-Sheet 6

INVENTOR
EDMOND LEON JEAN JADOUL
BY Richardson and David
ATTYS

Patented June 26, 1951

2,558,360

UNITED STATES PATENT OFFICE 2,558,360

METHOD AND MEANS FOR ELECTRICAL WELDING CHIEFLY IN THE PRODUCTION OF METAL CONTAINERS

Edmond Leon Jean Jadoul, Gembloux, Belgium, assignor to Ecremeuses Melotte, Société Anonyme, Remicourt, Belgium, a Belgian company Application February 15, 1949, Serial No. 76,576
In Belgium October 8, 1948

13 Claims. (Cl. 219—10)

The present invention has for its object a method and means for electrical welding, chiefly in the production of metal containers made of a ferrous metal or otherwise such as milk cans.

The invention may also be used for producing certain types of milking machine pots, comprising two parts made rigid with one another through welding.

For these operations oxyacetylenic torch, atomic hydrogen or the like welding methods have been resorted to.

This manner of operating shows the drawback of requiring skilled labor and of calling for an important finishing work consisting in grinding and polishing.

The consequence is that the grade of the weld depends on the skilfulness of the operator.

The present invention has for its object to remove such drawbacks and to allow executing such a welding through simple and rapid operations that require no special dexterity.

The method according to the invention consists in providing both parts to be welded and of which one may be slightly flaring with cooperating bevelled edges that show slopes of opposed directions whereby it is possible to obtain an overlapping of the edges without this leading to any extrusion of material towards the outside or the inside while the welding is executed through resistances opposed to the passage of the current as provided by a roller or wheel cooperating with a second roller or wheel or again with a swage or chuck for intimately urging the two bevels against one another.

In a practical embodiment of the invention, there is used an inner wheel, provided the latter and its spindle may pass through an opening coaxial with the axis round which the parts to be welded are adapted to rotate.

An inner swage or chuck is resorted to for instance in the case of a milking machine pot when the opening, through which the wheel is introduced is angularly shifted, is insufficiently large and located outside the axis of rotation of the parts to be welded. In accompanying drawings given by way of example and by no means in a binding sense, Figs. 1 to 11 refer to an embodiment incorporating an inner swage.

Figure 12:
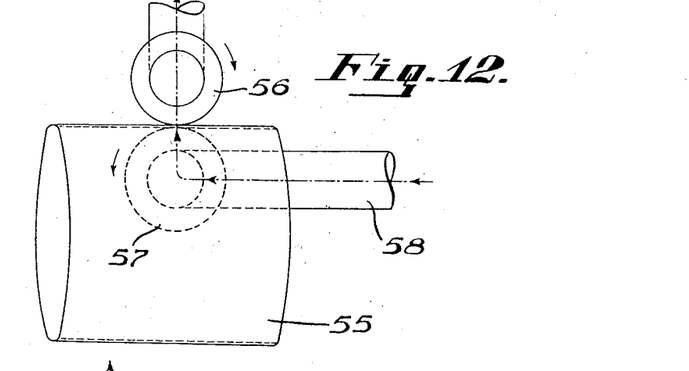
Figure 13:
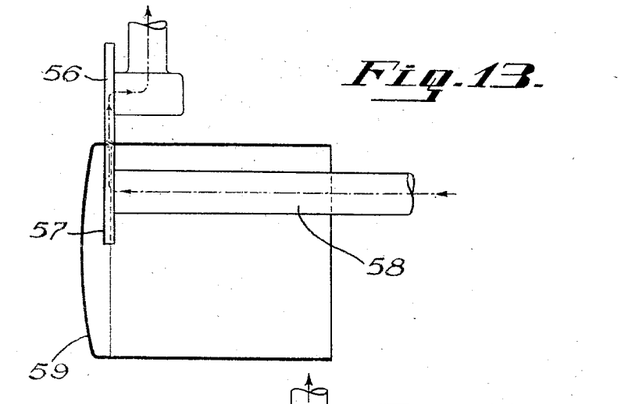
Figure 14:
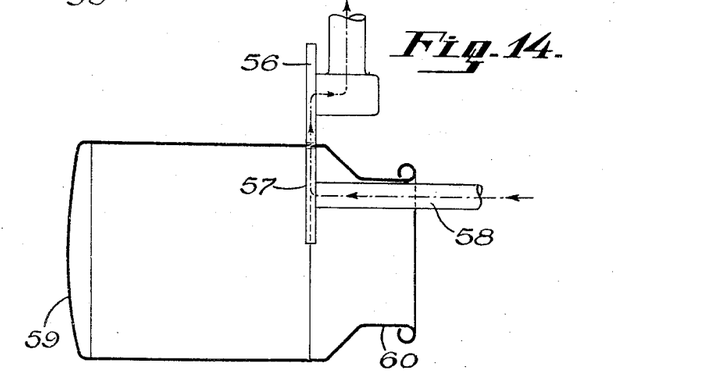

Figs. 12 to 14 relate to the modification incorporating an inner supporting wheel.

In the case of a swage being used, the latter may be mounted inside one part of the container and after positioning the other part and securing the whole system at least to a certain extent, the two parts are fitted between two cheeks adapted to rotate with the container and of which one is adapted to be shifted horizontally through the agency of a mechanism including chiefly on one hand an operating handwheel controlling this shifting movement and on the other hand members for guiding said movement.

The invention covers also the arrangements adapted to provide for the execution of the method.

In order that the improved method and means according to the invention may be properly understood, they will be now described with reference to accompanying drawings with the provision that the scope of the invention as defined in accompanying claims is by no means limited by the details of execution that will be given out solely by way of example.

In said drawings.

As already disclosed Figs. 12–13 and 14 relate to the case where the welding is executed through the agency of two wheels.

Figure 1:
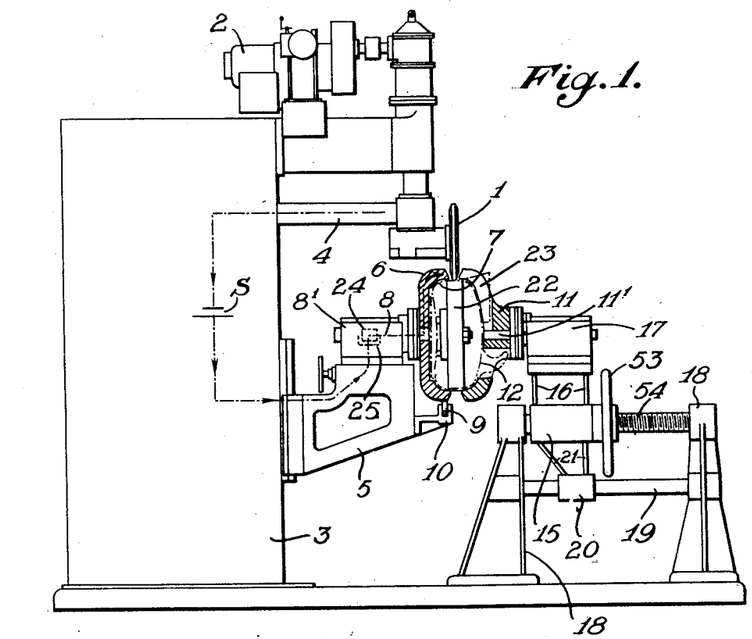
Fig. 1 is a general view of an arrangement adapted for use in the case of the production of a milking machine pot.

In the arrangement illustrated as a whole in Fig. 1, the outer wheel 1 preferably of bronze or chrome-plated metal is carried along into rotation in the usual manner through an electric motor 2; the machine includes an upright 3 wherewith are rigid in particular an upper horizontal arm 4 and a lower carrier 5 of bronze for instance.

A movable cheek 6, also of bronze, carries the lower part 7 of the container and may be set rotating through the agency of the wheel 1 and it bears through its lower end on a roller 9 carried by a projection 10 on the carrier 5. Said cheek 6 is provided to this purpose with a spindle 8 rotating inside a block 8¹, for instance of red copper and secured to the carrier 5. A second cheek 11, also of bronze, carries the upper part 12 of the container and is keyed to a spindle 11¹ rotating in ball bearings inside a block 17 adapted to slide horizontally under the control of a handwheel 53 including a nut threaded over the screw 54 and carrying along with it an equipment including a carrier 15 mounted on the screw shaft 54 and provided with arms 16 rigid with the block 17.

The screw 54 is carried by two uprights 18 between which is also arranged, in parallelism with the screw 54, a bar 19 on which may slide a sleeve 20 rigid with the carrier 15 through the agency of arms 21.

The system 15—16—17—20—21 is designed and constituted in a manner such as will, produce a horizontal coaxial shifting of the cheek 11 with reference to the cheek 6.

Figure 2:
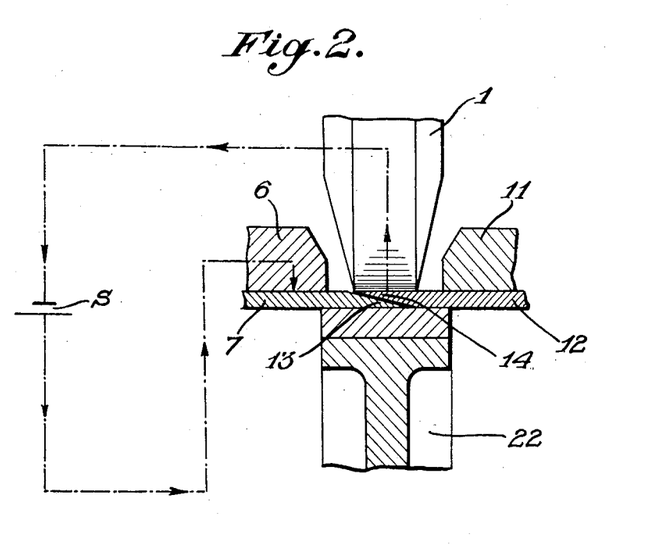
Figs. 2 and 2A are detail views on a larger scale of two modifications illustrating the cooperation between the two parts to be welded together and the outer wheel, cheeks and swage forming the welding means.
Figure 2A:
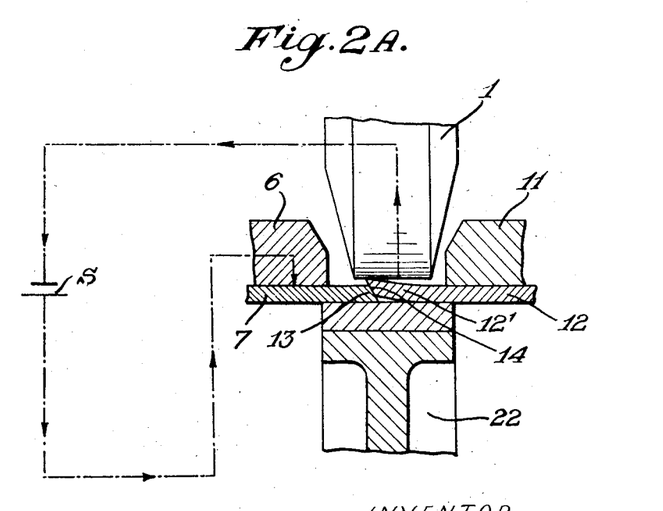

The chief feature of the method consists in that each of the parts 7 and 12 of the container (Fig. 3) is provided along its circular edge that lies in contact with the circular edge of the other with a bevel 13 or 14 as shown in Figs. 2 and 2A. These bevels are inclined in opposite directions in principle as illustrated in Fig. 2, but one of the two parts say part 12 may have its edge that is to be welded slightly flaring outwardly as illustrated at 12' (Fig. 2A), in order to produce a slight interengagement or movement of the two parts 7 and 12 towards one another, said bevels being urged together through the cooperation of the cheeks 6 and 11.

When the wheel 1 rotates (Fig. 1), it causes the whole assembly mounted on the spindles to rotate through its contacting with the part 12 on which it exerts a high pressure. In the case of Fig. 2A, this pressure is exerted on the flaring part 12¹. By depressing a pedal, the operator closes a circuit including the source S and the current from the column 3 passes into the carrier 5 and thence into the block 8¹, the spindle 8 and the flange 6 and then through the parts 7 and 12 between which it passes through the two bevels 13—14 so as to finally return through the wheel 1 into the column 3 through the agency of the arm 4 (Figs. 1-2 and 2A).

In order to allow the current to pass between the block 8¹ and the spindle 8 while allowing the rotation of the spindle 8, the spindle 8 carries a projection 24 that rotates inside a mercury-filled recess 25 in the block.

Current passes from one part 7 of the container into the other 12 through the contacting point between the bevels 13 and 14 and at this point the bevels are brought to welding temperature which allows their interpenetration and produces a sort of forging of the parts between the wheel and the inner swage 22.

During the welding, the wheel bears finally against either of the unheated parts and consequently the two welded bevels remain in the same plane. The weld obtained is smooth and reduces to a minimum the subsequent finishing steps consisting in grinding and polishing. Furthermore, the welding is uniform and homogeneous and provides for water tightness of the weld line that resists the action of the depression produced inside the milking pot as required in the operation of the milking machine.

Figure 3:
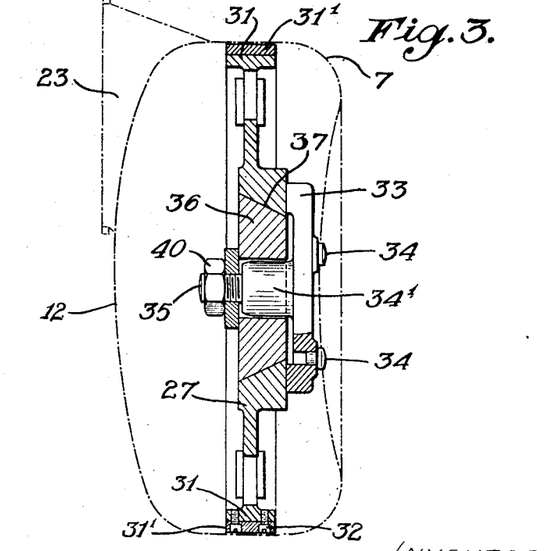
Figs. 3 and 4 relate to a first embodiment of the chuck, Fig. 3 being a cross-section through line III—III of Fig. 4 and Fig. 4 a plan view.

The swage 22 that resists the pressure exerted by the wheel is made of several parts and will be described hereinafter in a more detailed manner. It is assembled on the outside of the container and is constituted by different elements designed so as to allow their dismantling and removal through the neck 23 of the milking pot or the like container (Figs. 1 and 3).

The swage has therefore two parts to play, on one hand that of providing for the juxtaposition of the two parts or halves of the container before it is positioned between the cheeks and, on the other hand, that of preventing their collapse under the action of the pressure exerted by the wheel, which collapse would be particularly easy at the moment of the welding as the metal is then red hot. The swage smoothes furthermore the internal surface of the weld.

Figure 4:
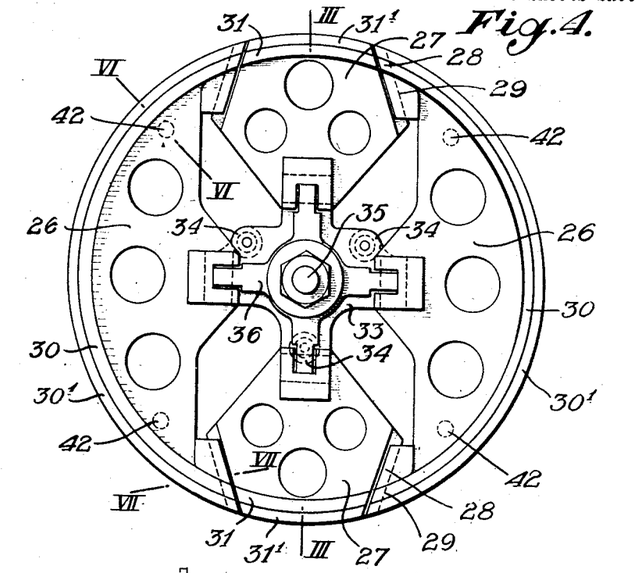
Figure 5:
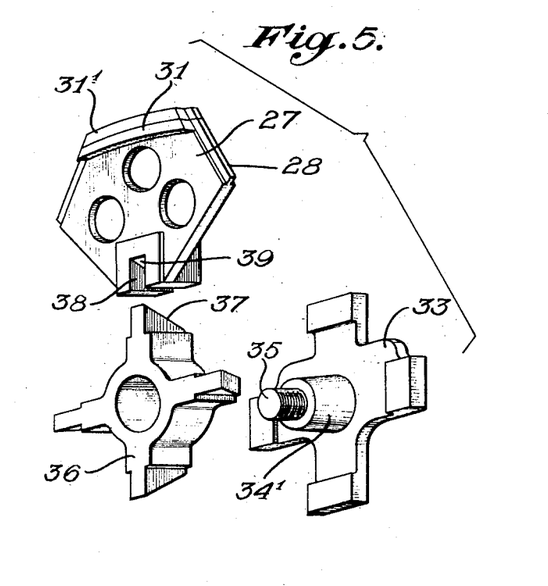
Fig. 5 is an exploded view showing the three principal parts of the swage.
Figures 6, 7:
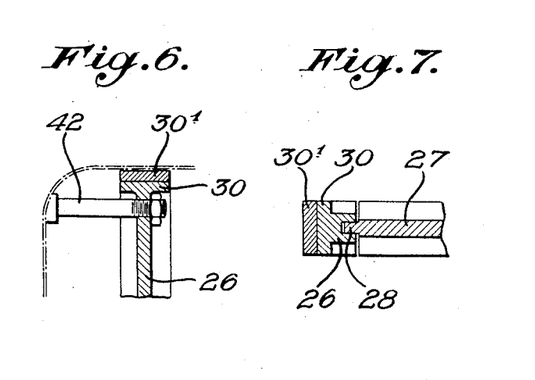
Fig. 6 is a cross-section through line VI—VI of Fig. 4.
Fig. 7 is a cross-section through line VII—VII of Fig. 4.

In the example illustrated in Figs. 3 to 7, the swage is constituted by four members of which two, 26, assume the shape of segments of a circle and the two others 27 assume a substantially pentagonal shape with however an arcuate side and are rigid with tongues 28 cooperating with grooves 29 in the segments 26 so as to allow a relative radial sliding of the pentagonal part 27 with reference to the segments 26 (Fig. 4).

When the members 26 and 27 are arranged in the manner illustrated in Fig. 4, they define through the flanges 30 or 31 provided along their outer curvilinear edges or sides a peripheral ring. To each elementary flange 30 or 31 is secured, for instance through screws 32 (Fig. 3), an element 30¹ or 31¹ preferably of bronze or chrome-plated metal so as to form a continuous outer protecting ring of such a metal.

The members 26 and 27 are mounted on a cross-shaped carrier 33 (Figs. 3 and 5) that bears against the lower part of the container through rubber pads or washers 34 (Figs. 3 and 4) and has at its center a projection 34¹ carrying a threaded rod 35. A second cross-shaped member 36 is fitted with some clearance over said projection 34¹ and shows at the outer ends of its arms sloping surfaces 37 flaring outwardly towards the neck of the container. These arms engage corresponding mortises 38 (Fig. 5) formed in the members 27 and 28 and provided also with end surfaces 39 sloping in correspondency with the slopes of the surfaces 37.

The mounting of said swage is operated as follows:

The lower part 7 of the receiver is laid on a table and the carrier 33 is positioned over its center.

On this carrier are positioned in succession the two segments 26 that rest each on two feet 42 (Figs. 4 and 6) and then, through a sliding movement between said segments, the two parts 27 are positioned in their turn.

The cross-shaped member 36 is then positioned in a manner such that the end of each arm may engage the corresponding mortise 38.

Through action on the nut 40 (Fig. 3) engaging the threaded rod 35, the cross-shaped member 36 is caused to slide in the mortises 38 and through the cooperation of the parallel surfaces 37 and 39, there is obtained together a horizontal and radial shifting of the members 26 and 27 that move away from the axis of the container and produce an increase in diameter of the ring 30—31.

When the upper part 12 of the container has been fitted over the swage the system is clamped to a certain extent by means of a wrench engaging the neck and acting on the nut 40 (Fig. 3). This assembly is then positioned inside the cheek 6 and the cheek 11 is brought against the parts to be welded and urged formardly through the handwheel 53. The nut 40 is then screwed home through the neck of the upper part 12 so as to provide a perfect contact between the periphery of the swage and the parts to be welded.

After the container has been welded, the two cheeks are separated and the container is brought on to the dismantling table. It is sufficient to proceed in a manner opposed to that disclosed hereinabove in order to execute the dismantling and to remove all the components of the swage.

Figure 8:
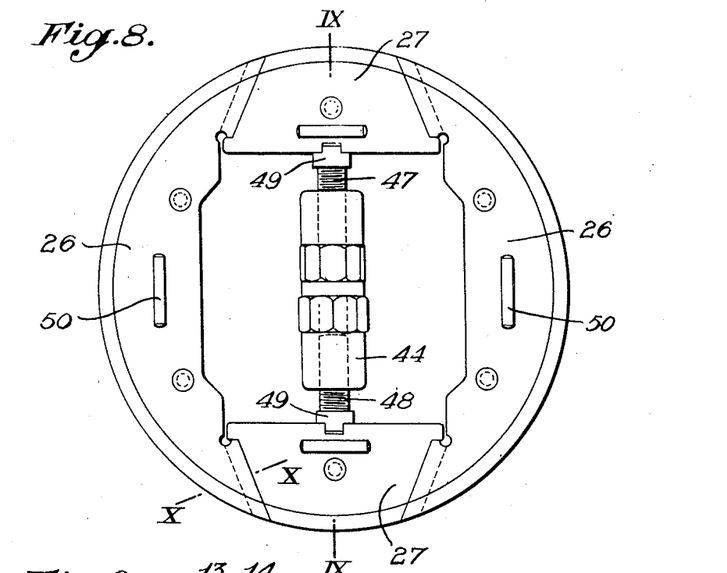
Figs. 8 and 9 relate to a second embodiment of the chuck, Fig. 9 being a cross-section through line IX—IX of Fig. 8.
Figure 9:
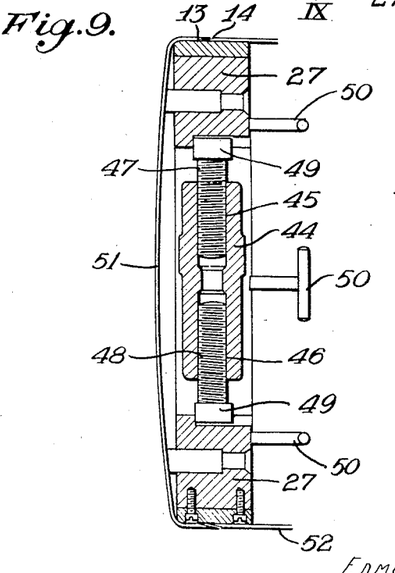
Figure 10:
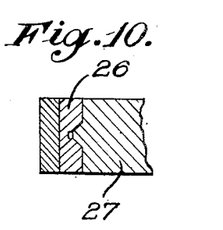
Fig. 10 is a cross-section through line X—X of Fig. 8.

Figs. 8-9 and 10 relate to a modified embodiment wherein the control is no longer performed through an axial shifting of the cross-shaped member but through the agency of a double nut 44 having a right hand thread 45 and a left hand thread 46 cooperating respectively with the threaded rods 47 and 48 arranged in alignment. These rods are thus adapted to move perpendicularly to the axis of the container and to produce thereby through the agency of an abutting member 49 a shifting apart of the swage members 27 and therethrough of the segments 26. The members 26 and 27 are advantageously provided with handles 50 that make their control easier. The arrangement according to Figs. 3, 4, 8 and 9 is very suitable for the execution of milk cans, chiefly with a view to the welding of the bottom 51 to the body 52.

The different parts incorporated in the execution of the swages should be made of a material adapted to resist the pressure of the wheel. They have preferably the same composition as the wheel itself.

The method described allows executing the welding between the two parts of the can or the like container in a same plane with a maximum cleanliness of the weld and consequently a minimum subsequent grinding and polishing of the latter while a minimum pressure is exerted by the wheel.

Figure 11:
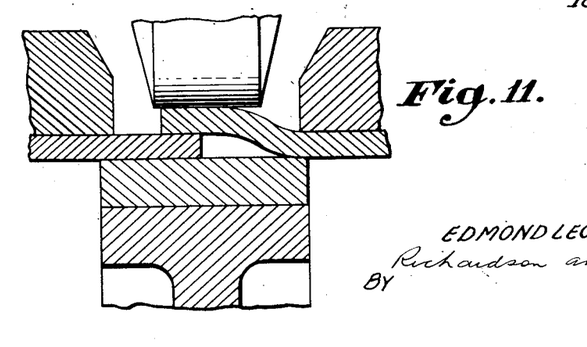
Fig. 11 is an explanatory view relating to a known method.

Fig. 11 illustrates the well-known method for electric welding through overlapping and crushing of the welded parts to bring the latter substantially in the same plane. In practice, it is admitted that this method requires an overlap of at least one and one half times the thickness of the material which leads to an excess of material at the point of welding that is equal to one and one half times the normal thickness of the metal sheet. Now, as this type of welding requires also a very energetic securing of the two parts to be welded, the deformation due to the crushing of the extra thickness of the metal produces a consequent lengthening and thereby a deformation of the welded parts as the wheel progresses. It is also a well known fact that in the case of a welding operated through overlapping of cylindrical bodies, the fold in the overlapping edge and the projecting parts of the metal sheets require a considerable pressure which rapidly damages the wheel and the swage. In contradistinction, in the case of the welding of bevelled cylindrical parts, as in the case of the present invention, this drawback is altogether removed.

Fig. 12-13 and 14 relate to applications wherein instead of resorting to an internal swage, the welding operations may be performed through the agency of two wheels, an outer wheel and an inner wheel.

The swage illustrated in Figs. 3 to 9 is essential for instance in the case of a milking machine pot when the introduction may be executed through an opening that is angularly shifted with reference to the axis as in the case of Fig. 3, that is not sufficiently large and that lies on the outside of the rotary axis of the parts to be welded which makes it impossible to use a second inner wheel.

Fig. 12 illustrates the longitudinal welding of a cylindrical ferrule 55 open at both ends.

This case is a current one for technical purposes and is met in particular in the production of milk cans.

For the formation of the body of the can (Fig. 12) the edges to be juxtaposed are bevelled as provided hereinabove and as disclosed with reference to Figs. 2 and 2A and the longitudinal welding is executed by means of two wheels 56 and 57, of which the inner wheel 57 rotates round its spindle 58.

Fig. 13 illustrates the application, through welding to the same cylindrical ferrule 55, of a bottom 59 with the use also of an outer wheel 56 and of an inner wheel 57.

Fig. 14 illustrates the manner of welding the neck 60 of a container such as a milk can also through the agency of the two wheels 56 and 57.

In each of the operations illustrated with reference to Figs. 12-13 and 14, the inner wheel may pass with its spindle through the opening of the part to be welded that is coaxial with its axis of rotation.

The passage of current is shown in Figs. 12-13 and 14 by a dot and dash line.

What I claim is:

1. In apparatus for electrically welding two parts of a metallic container interengaging one another through bevelled cooperating edges of opposite directions, in combination, a wheel adapted to engage the outer periphery of the container parts, said wheel lying in the plane of their cooperating bevelled edges, a disconnectable swage mounted in the inside of one of the parts to be welded and positioned so as to inwardly support the edges of the container parts in register with the wheel to prevent their collapse when heated to welding temperatures, means for driving the wheel and thereby frictionally constraining the container to rotate, and means for feeding an electric welding current through the cooperating bevelled edges of the parts to be welded.

2. In apparatus for electrically welding two parts of a metallic container interengaging one another through bevelled cooperating edges of opposite directions, in combination, a wheel adapted to engage the outer periphery of the container parts, said wheel lying in the plane of their cooperating bevelled edges, a disconnectable swage constituted of parts forming a continuous outer ring, mounted in the inside of one of the parts to be welded and positioned so as to inwardly support the edges of the container parts in register with the wheel to prevent their collapse when heated to welding temperatures, means for driving the wheel and thereby frictionally constraining the container to rotate, and means for feeding an electric welding current through the cooperating bevelled edges of the parts to be welded.

3. In apparatus for electrically welding two parts of a metallic container interengaging one another through bevelled cooperating edges of opposite directions, in combination, two rotating cheeks between which the two parts to be welded are adapted to be held, a wheel adapted to engage the outer periphery of the container parts, said wheel lying in the plane of their cooperating bevelled edges, a disconnectable swage mounted on the inside of one of the parts to be welded and positioned so as to inwardly support the edges of the container parts in register with the wheel to prevent their collapse when heated to welding temperatures, means for driving the wheel and thereby frictionally constraining the container and cheeks to rotate, and means for feeding an electric welding current through the wheel, the cooperating edges of the part to be welded and one of said cheeks.

4. In apparatus for electrically welding two parts of a metallic container interengaging one another through bevelled cooperating edges of opposite directions, said container having an opening located outside the axis of rotation of the parts to be welded, in combination, two rotating cheeks between which the two parts are adapted to be held, a wheel adapted to engage the outer periphery of the container parts, said wheel lying in the plane of their cooperating bevelled edges, a disconnectable swage mounted on the inside of one of the parts to be welded and positioned so as to inwardly support the edges of the container parts in register with the wheel to prevent their collapse when heated to welding temperatures, said disconnectable swage being constituted of parts forming a continuous outer ring, means for driving the wheel and thereby frictionally constraining the container and cheeks to rotate, and means for feeding an electric welding current through the wheel, the cooperating bevelled edges of the parts to be welded and one of said cheeks.

5. In apparatus for electrically welding two parts of a metallic container interengaging one another through bevelled cooperating edges of opposite directions, in combination, two rotating cheeks between which the two parts are adapted to be held, a wheel adapted to engage the outer periphery of the container parts, said wheel lying in the plane of their cooperating edges, a bearing member inside said cheeks for holding the cooperating container edges through the inside thereof, said bearing member including a plurality of easily disconnectable members forming in assembled position a continuous outer ring resisting the pressure exerted outwardly, means for driving the wheel and thereby frictionally constraining the container and cheeks to rotate, and means for feeding an electric welding current through the wheel, the cooperating bevelled edges of the parts to be welded and one of said cheeks.

6. In apparatus for electrically welding two parts of a metallic container interengaging one another through bevelled cooperating edges of opposite directions, in combination, two rotating cheeks between which the two parts are adapted to be held, a wheel adapted to engage the outer periphery of the container parts, said wheel lying in the plane of their cooperating bevelled edges, a disconnectable swage mounted on the inside of one of the parts to be welded and positioned so as to inwardly support the edges of the container parts in register with the wheel to prevent their collapse when heated to welding temperatures, said disconnectable swage being constituted of parts forming a continuous outer ring, means for driving the wheel and thereby frictionally constraining the container and cheeks to rotate, a body to which said wheel is rotatably secured, a supply of electric energy carried by said body, means on said body to which the first cheek is rotatably secured, means for rotatably carrying the second cheek, and an electric circuit adapted to feed welding current from the supply to the two bevelled edges through the wheel on one hand and through said first cheek on the other.

7. In apparatus for electrically welding two parts of a metallic container interengaging one another through bevelled cooperating edges of opposite directions, in combination, two rotating cheeks between which the two parts to be welded are adapted to be held, a wheel adapted to engage the outer periphery of the container parts, said wheel lying in the plane of their cooperating bevelled edges, a disconnectable swage mounted on the inside of one of the parts to be welded and positioned so as to inwardly support the edges of the container parts in register with the wheel to prevent their collapse when heated to welding temperatures, said disconnectable swage including a support engaging centrally one of the container parts, a plurality of radially sliding members carried by said support, means adapted to urge said radially sliding members into engagement with the inner periphery of the cooperating bevelled edges, means for driving the wheel and thereby frictionally constraining the container and cheeks to rotate, and means for feeding an electric welding current through said wheel, the cooperating bevelled edges of the parts to be welded and one of said cheeks.

8. In apparatus for electrically welding two parts of a metallic container interengaging one another through bevelled cooperating edges of opposite directions, in combination, two rotating cheeks between which the two parts are adapted to be held, a wheel adapted to engage the outer periphery of the container parts, said wheel lying in the plane of their cooperating bevelled edges, a disconnectable swage mounted on the inside of one of the parts to be welded and positioned so as to inwardly support the edges of the container parts in register with the wheel to prevent their collapse when heated to welding temperatures, said disconnectable swage including a support engaging centrally one of the container parts a plurality of radially sliding members carried by said support, engaging one another in sliding relationship, means for controlling the radial movement of said members from the outside, means adapted to urge said radially sliding parts into engagement with the inner periphery of the cooperating bevelled edges, means for driving the wheel and thereby frictionally constraining the container and cheeks to rotate, and means for feeding an electric welding current through said wheel, the cooperating bevelled edges of the parts to be welded and one of said cheeks.

9. In apparatus for electrically welding two parts of a metallic container interengaging one another through bevelled cooperating edges of opposite directions, in combination, two rotating cheeks between which the two parts are adapted to be held, a wheel adapted to engage the outer periphery of the container parts, said wheel lying in the plane of their cooperating bevelled edges, a disconnectable swage mounted on the inside of one of the parts to be welded and positioned so as to inwardly support the edges of the container parts in register with the wheel to prevent their collapse when heated to welding temperatures, said disconnectable swage including a support engaging centrally one of the container parts, a plurality of radially sliding members carried by said support, a cross-member adapted to move axially of the support and to urge positively the different members of the swage radially towards the inner periphery of the bevelled edges, said cross-member engaging said sliding members through longitudinally sloping planes whereby the longitudinal movement of the cross-member urges the swage members away from the container axis, means for driving the wheel and thereby frictionally constraining the container and cheeks to rotate, and means for feeding an electric welding current through said wheel, the cooperating bevelled edges of the parts to be welded and one of said cheeks.

10. In apparatus for electrically welding two parts of a metallic container interengaging one another through bevelled cooperating edges of opposite directions, in combination, two rotating cheeks between which the two parts are adapted to be held, a wheel adapted to engage the outer periphery of the container parts, said wheel lying in the plane of their cooperating bevelled edges, a disconnectable swage mounted on the inside of one of the parts to be welded and positioned so as to inwardly support the edges of the container parts in register with the wheel to prevent their collapse when heated to welding temperatures, said disconnectable swage including a support engaging centrally one of the container parts, a plurality of radially sliding members carried by said support, an extensible rod arranged radially of the swage and engaging two opposite members thereof, means controlled through the outside of the container for controlling the operative length of said rod, means for driving the wheel and thereby frictionally constraining the container and cheeks to rotate, and means for feeding an electric welding current through said wheel, the cooperating bevelled edges of the parts to be welded and one of said cheeks.

11. Apparatus comprising a wheel adapted to engage only the outwardly flaring portion of one of the parts of said metallic container, a bearing member mounted in the inside of one of the parts to be welded, positioned so as to inwardly support the bevelled edges of the container in register with the wheel to prevent their collapse when heated to welding temperature, means for driving the wheel and thereby frictionally constraining the container to rotate, and means for feeding an electric welding current through the cooperating bevelled edges of the parts to be welded.

12. Apparatus comprising a wheel adapted to engage only the outwardly flaring portion of one of the parts of said metallic container, a disconnectable swage mounted in the inside of one of the parts to be welded, positioned so as to inwardly support the bevelled edges of the container in register with the wheel to prevent their collapse when heated to welding temperatures, means for driving the wheel and thereby frictionally constraining the container to rotate, and means for feeding an electric welding current through the cooperating bevelled edges of the parts to be welded.

13. Apparatus comprising two rotating cheeks between which the two parts to be welded are adapted to be held, a wheel adapted to engage only the outwardly flaring portion of one of the parts of the metallic container, a disconnectable swage mounted on the inside of one of the parts to be welded and positioned so as to inwardly support the edges of the container parts in register with the wheel to prevent their collapse when heated to welding temperatures, means for driving the wheel and thereby frictionally constraining the container and cheeks to rotate, and means for feeding an electric welding current through the wheel, the cooperating edges of the parts to be welded and one of said cheeks.

EDMOND LEON JEAN JADOUL.

REFERENCES CITED

The following references are of record in the file of this patent:

UNITED STATES PATENTS

| Number | Name | Date |
| --- | --- | --- |
| 1,249,532 | Smith et al. | Dec. 11, 1917 |
| 1,642,825 | Pearce | Sept. 20, 1927 |
| 2,107,093 | Terrell | Feb. 1, 1938 |
| 2,353,868 | Bisbee et al. | July 18, 1944 |

FOREIGN PATENTS

| Number | Country | Date |
| --- | --- | --- |
| 580,835 | Great Britain | Sept. 20, 1946 |
| 839,270 | France | Dec. 26, 1938 |